S. HEDGES & L. B. MORGAN.
Pivoted Adjustable Seat for Harvesters, &c.

No. 224,905.    Patented Feb. 24, 1880.

WITNESSES:
W. W. Hollingsworth
Amos W. Hart

INVENTOR:
Saml. Hedges
L. B. Morgan
BY
ATTORNEYS.

UNITED STATES PATENT OFFICE.

SAMUEL HEDGES, OF WHEELING, AND LEWIS B. MORGAN, OF WEST LIBERTY, WEST VIRGINIA.

PIVOTED ADJUSTABLE SEAT FOR HARVESTERS, &c.

SPECIFICATION forming part of Letters Patent No. 224,905, dated February 24, 1880.

Application filed June 25, 1879.

*To all whom it may concern:*

Be it known that we, SAMUEL HEDGES, of Wheeling, and LEWIS B. MORGAN, of West Liberty, in the county of Ohio and State of West Virginia, have invented a new and Improved Pivoted Adjustable Seat; and we do hereby declare that the following is a full, clear, and exact description of the same.

The object of our invention is to provide an improved adjustable seat for mowers, reapers, wheeled horse hay-rakes, and various other agricultural machines; also, for farm-wagons and other vehicles, or for use in any other situations in which it may be applicable, which seat shall be capable of oscillation or adjustment laterally on a fixed point of support, so that it may be kept in horizontal position despite the lateral inclination of the body of the machine or vehicle while passing along a hill-side or other inclined surface.

For this purpose we pivot the seat on a fixed rod or other equivalent support, around which it may oscillate laterally, and we provide devices for producing the friction requisite to prevent the too easy movement of the seat, and also devices for bracing the seat firmly in any adjustment.

The details of construction and arrangement of parts are as hereinafter described, and shown in accompanying drawings, forming part of this specification, in which—

Figure 1:
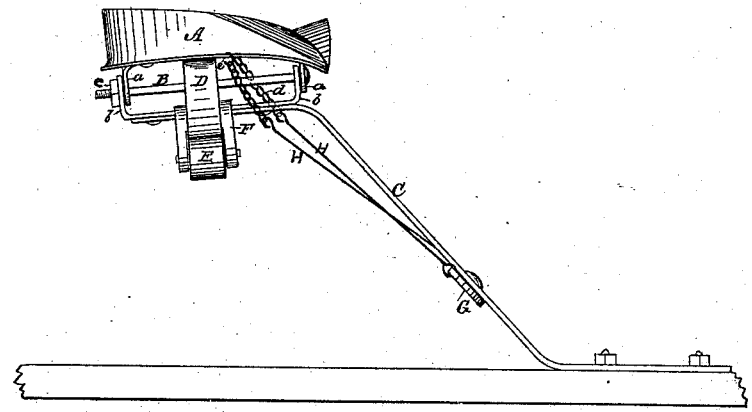
Figure 2:
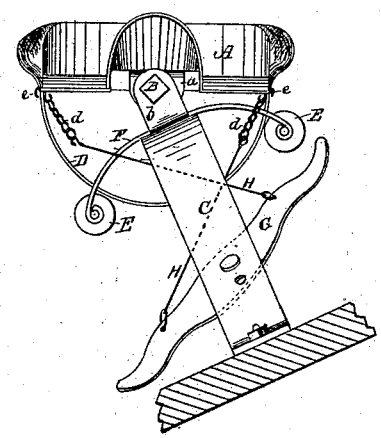

Figure 1 is a side view of our improved seat. Fig. 2 is a front view of the same, showing the seat-support tilted or in the inclined position it assumes when the machine or vehicle is passing along a declivity.

The seat A has pendent perforated lugs *a* attached to its under side, by which it is supported and pivoted on the rod B. The latter passes through upwardly-projecting lugs *b*, attached to the spring or other support C. The said rod or axis B is arranged directly beneath and parallel to the lengthwise middle portion of the seat A. Hence the latter will oscillate laterally on the rod in a vertical plane at right angles to the general direction of motion of the machine or vehicle. Therefore, when the machine or vehicle to which the seat is attached passes along a hill-side or other inclined surface, and is thus caused to incline laterally, the seat A may be kept horizontal laterally, thus conducing to the ease and comfort of the driver, and also his safety. Such movement or adjustment of the seat with reference to the machine or vehicle is illustrated in Fig. 2.

As a further means of support for the seat A besides the rod B, and also as a means of preventing too quick oscillation of the seat, we attach the ends of a semicircular bar, D, to its under side, and arrange the same transversely, so as to rest on rollers E, which are journaled in the downwardly-curved ends of a bar, F, that is attached transversely to the spring C directly beneath the middle of the seat. The semicircular bearing D necessarily passes through slots in the supporting-bar F.

The rollers E have sufficient friction with the bearing D to cause the seat to move steadily and somewhat slowly from one position or adjustment to another. The friction of the seat with the rod B may also be increased by screwing up the nut *c* on the rod; thus causing the lugs *a* to press more closely upon the lugs *b*.

To enable the driver to hold the seat A fixed in any position or lateral adjustment, we employ the foot-lever G and rods H. The foot-lever is pivoted to the spring C near its lower end, and each rod H extends from an end of the lever to the diagonally-opposite side of the seat. Thus by pressure of the foot on one arm of the lever G the driver is enabled to hold the seat A inclined toward the other side of the machine or vehicle. In other words, the foot-lever and its attached rods form a movable brace for the seat. Independent of this function, the lever and rods may also be used to assist the driver in adjusting the seat from one position to another when occasion requires.

The pivot of the lever G may be placed higher or lower on the spring C, to accommodate the length of leg of the driver, and the rods H are attached to the seat A by means of chains *d* and hooks *e*, to enable the rods to be practically lengthened or shortened correspondingly.

We do not claim, broadly, a seat adapted to oscillate laterally; but

What we claim is—

1. The combination of a laterally-oscillating seat with a pivot-rod fixed parallel to the general line of motion of the machine or vehicle of which said seat forms a part, the lugs or supports for the seat, and a nut on said rod, as shown and described, whereby the adjustment of the nut will increase or diminish the friction of the seat-pivots.

2. The combination, with the seat pivoted and thereby adapted to oscillate laterally, of the foot-lever pivoted as described, and the diagonally-crossed rods connecting said seat and foot-lever, as specified.

3. The foot-lever having an adjustable connection with the seat-support, the pivoted seat, and the rods having an adjustable connection with the seat, substantially as shown and described.

SAMUEL HEDGES.
    LEWIS B. MORGAN.

Witnesses:
 OLIVER E. MURRAY,
 WILLIAM P. KIMMINS.